Aug. 10, 1954
J. M. PESTARINI
2,686,288
REGULATING DEVICE FOR ELECTRIC MACHINES
Filed Sept. 23, 1948
2 Sheets-Sheet 1
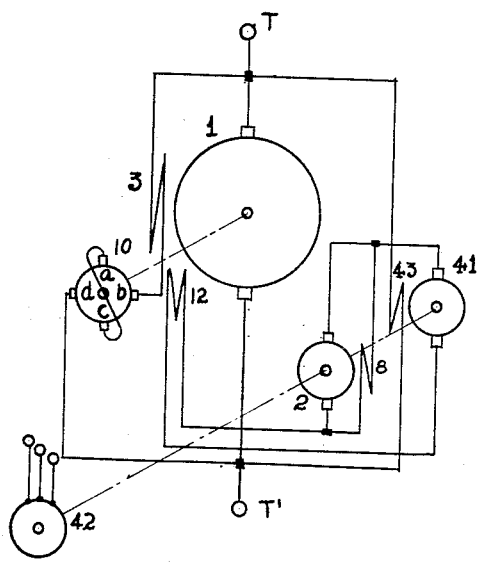
Fig 1
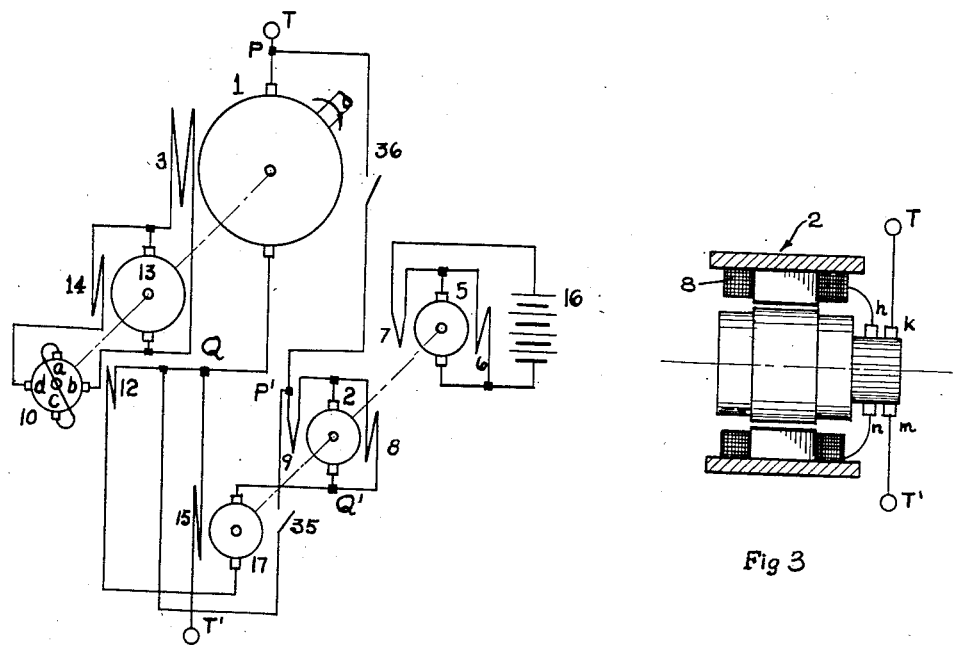
Fig 2
Fig 3
INVENTOR.
*J. M. Pestarini*

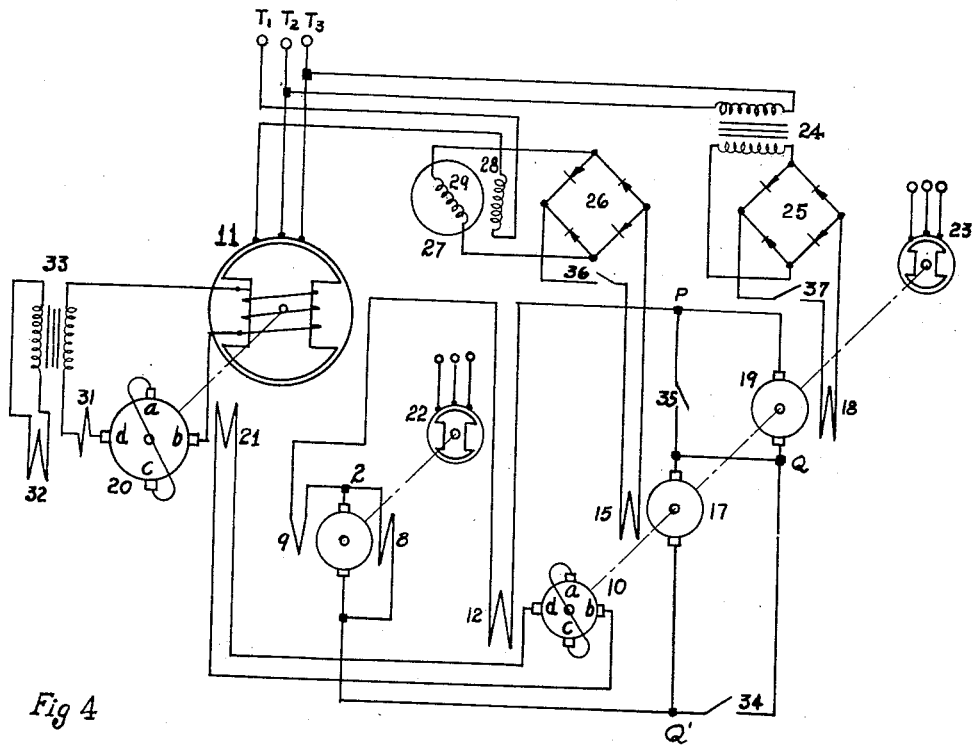
Fig 4
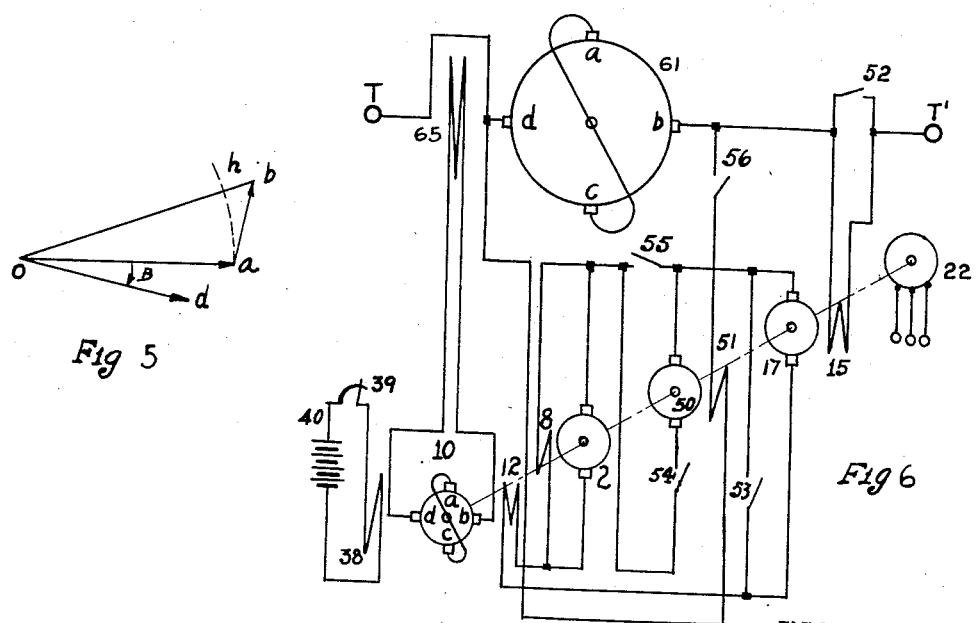
Fig 5
Fig 6
INVENTOR.

Patented Aug. 10, 1954

2,686,288

UNITED STATES PATENT OFFICE 2,686,288

REGULATING DEVICE FOR ELECTRIC MACHINES

Joseph Maximus Pestarini, Staten Island, N. Y.

Application September 23, 1948, Serial No. 50,735

7 Claims. (Cl. 322—28)

This invention relates to a system for regulating the power supply of direct or alternating current machines.

An object of this invention is to provide a system which includes a set of dynamo electric machines, some of which are adapted to create a voltage proportional to the voltage of the power supply while others of which are adapted to create a voltage proportional to the current of the power supply.

Another object of this invention is to provide in a system of the character described, interrelated electrical machines which are adapted for continuous operation and permit one of the machines to have a performance involving the use of any arbitrarily defined linear combination of voltage and current.

In the drawings, Fig. 1 shows a system embodying the invention; Fig. 2 shows a modification thereof; Fig. 3 shows details of construction of an electrical machine forming a part of the invention; Fig. 4 shows a modification of the invention involving the use of an alternator; Fig. 5 is a vector diagram relating to the operation of the system shown in Fig. 4 and Fig. 6 shows a further modification of the invention.

Referring in detail to the drawings, in Fig. 1, I designates a dynamo electric machine having an armature with terminals T, T' and an excitation field winding 3. An auxiliary dynamo 2, for creating an arbitrarily determined voltage, includes a shunt connected exciting field winding 8. The dynamo 2 is adapted to be driven at constant speed by an alternating current machine 42 which may be supplied with three phase current of constant frequency. The dynamo 2 is connected in opposed relation to a dynamo machine 41. The machine 41 includes a field winding 43 which is connected across the terminals T, T'.

A dynamo electric machine 10 of the amplifier metadyne type is connected between the field windings 3 and 43. The machine 10 comprises an armature provided with a pair of short circuited primary brushes $a$, $c$, and a pair of secondary brushes $b$, $d$, which are series connected with windings 3, 43. The machine 10, which may be driven by machine 1, is more fully described in Patent 2,112,604 and British Patent 420,167. The machine 10 further includes a stator winding 12 which is connected to a terminal of machine 41 and a terminal of dynamo 2.

Such an arrangement is of particular value when the voltage of machine 1 is high compared to the voltage produced by dynamo 2. A differential or regulating current resulting from any difference between the arbitrarily defined voltage produced by dynamo 2 and the voltage induced by machine 41 and proportional to the actual voltage produced by machine 1, traverses the winding 12 of machine 10 to control the output thereof, thereby regulating the input to the winding 3 of machine 1. In this manner the operation of machine 1 is effectively regulated.

The machine 10 may be alternatively driven by machine 42 or by other suitable means. In lieu of constant frequency alternating current, a direct current shunt excited, non-saturated machine may be used since such machine will rotate at substantially constant speed even if the direct current source supplies a voltage varying between limits of 25% difference.

In the system shown in Fig. 2, the dynamo machine 1 has its field winding 3 energized by an exciter dynamo 13 which is connected across the secondary brushes $b$, $d$ of machine 10. The shunt field winding 14 of dynamo 13 is connected in the secondary brush circuit of machine 10. The dynamo 2, which provides a reference voltage of an arbitrary value, is connected across the terminals T, T' of the machine 1, and is driven by a motor 5 having shunt winding 6 and which is energized by means of a battery 16. Another dynamo 17, which is coupled to dynamo 2, includes a field excitation winding 15 which is connected across the terminals of machine 1. The armature of dynamo 17 is connected in series with the armature of dynamo 2. A switch 36 is provided in a conductor connecting one terminal of machine 1 and one terminal of dynamo 2. A second switch 35 is inserted in a conductor connecting the last mentioned terminal of dynamo 2 and the other terminal of machine 1.

Assuming that the switch 36 is closed and switch 35 is opened, then the dynamo 2 which produces an arbitrary voltage and the dynamo 17 which produces a voltage proportional to the current of machine 1, are connected in series and form a system which is connetced in opposed relation to the terminals of machine 1. The magnetic circuit of dynamo 17 is assumed to be unsaturated and therefore, the voltage induced by the system comprising dynamos 2, 17, between points indicated as P and Q, is an arbitrarily defined linear combination of an arbitrarily defined voltage and current of the machine 1. If the voltage actually induced by machine 1 between points P, Q, is equal to the above mentioned combination, no regulating current will be induced. If the two opposed voltages at points P, Q, are different, a large regulating current will be induced for even a small difference in the opposed voltages. Such regulating current is adapted to traverse the stator winding 12 of machine 10. The actual voltage of machine 1, in opposition to the sum of the voltages induced by machines 2, 17, thus produces the regulating current which is adapted to regulate the operation of the exciter dynamo 13, through the winding 14 thereof which in turn regulates the operation of machine 1.

In order to assure the operation of motor 5 at constant speed, an auxiliary field excitation wind 7 is connected in series with the battery 16 and the armature of the motor, thus correcting for any voltage variations in the battery. The winding 7 may be set to induce a voltage compensating the ohmic drop in the armature circuit of the motor 5. The magnetic circuit of the motor 3 is assumed as being completely unsaturated.

In addition to the main, shunt connected excitation field winding 8 on dynamo 2, an auxiliary series connected excitation winding 9 is provided for inducing a voltage compensating the ohmic drop in the external circuit of dynamo 2. This arrangement increases the precision of control of the system.

Assuming that switch 36 is opened and switch 35 is closed, then the dynamos 2 and 17 are opposed to one another at points indicated as P' and Q'. In this case, the voltage induced by the dynamo 17, which is proportional to the current of machine 1, must balance at any moment, the arbitarily defined voltage induced by dynamo 2. Even a small discrepancy between the opposed voltages will create a regulating current which traverses the stator winding 12 and thereby correct the field excitation 3 of the machine 1. Thus the current of machine 1 is controlled except for the small variation from the desired value necessary for creating the correct regulating current.

In lieu of motor 5, a synchronous motor which is energized from a suitable network of constant frequency current, may be used.

As shown in Fig. 3, the armature of dynamo 2 may be provided with a pair of brushes k, m, for connection to terminals T, T' and a second pair of brushes h, n, for energizing the field winding 8. This arrangement permits the main shunt field excitation winding to be independent of the ohmic drop at the brushes k, m, which is variable and dependent on the load of dynamo 2. A similar arrangement may be used with motor 3.

An alternator 11 may be controlled in accordance with the invention, as shown in Fig. 4. The dynamo 2, which comprises field windings 8, 9, is adapted to produce a reference voltage, as previously described and is connected across the dynamo 17. The dynamo 2 is driven by a synchronous motor 22 which is adapted to be energized from a network having a constant frequency. The dynamo 17 which is adapted to supply a voltage proportional to the current of alternator 11, includes an excitation winding 15 which is energized by the output of a rectifier bridge 26. Input current for bridge 26 is supplied by an angularly displaceable winding 29 of a transformer 27, the fixed winding 28 of which is connected in one of the supply lines of alternator 11. In this way, dynamo 17 is adapted to induce a voltage proportional to the intensity of the current supplied by the alternator and the factor of proportion may be readily adjusted by modifying the angular position of winding 29 with respect to the winding 28 of the transformer 27.

A dynamo 19 is provided for producing a voltage proportional to the actual voltage of the alternator 11. The dynamo 19 is independently excited by a field winding 18 which is energized by the output of a rectifier bridge 25. The input of bridge 25 is supplied by the secondary winding of a transformer 24, whose primary winding is connected across a pair of terminals of the alternator 11. A switch 37 is inserted in the circuit of field winding 18, and similarly, a switch 36 is inserted in the circuit of field winding 15. It is apparent, that when the switch 37 is closed, the dynamo 19 produces a voltage proportional to the actual voltage of the alternator 11. The dynamos 17, 19 are driven by a synchronous motor 23.

A switch 34 is inserted between a terminal of dynamo 17 and a terminal of dynamo 19. Another switch 35 is inserted between the other terminal of dynamo 17 and the other terminal of dynamo 19. Assuming that switches 34 and 37 are closed while switches 35 and 36 are opened, then dynamo 2 which is connected across dynamos 17 and 19, is in opposed relation to dynamo 19 at points P, Q. In this case a slight difference between the opposed voltages will create a regulating current which is adapted to traverse the stator winding 12 of a dynamo machine 10 of the metadyne type, as previously described, the winding 12 being connected between one terminal of dynamo 2 and one terminal of dynamo 19. The machine 10 supplies through its secondary brushes b, d, current for a stator winding 21 of a second dynamo machine 20, also of the amplifier metadyne type previously referred to. The secondary brushes b, d of machine 20 provide current for the field winding of the alternator 11.

Thus, the system provides voltage regulating means which is operative to cause the alternator 11 to create an arbitrarily defined voltage except for a slight departure therefrom for inducing the regulator current. When the switches 34, 37 are opened and switches 35, 36 are closed, then the dynamo 2 is connected in opposed relation to dynamo 17 at points P', Q' and the system is then adapted to regulate the current of the alternator.

Assuming finally, that switches 36, 37 are closed while switches 34, 35 are open, then the dynamo 19 is connected in opposed relation to the system constituted by the series connected dynamos 2, 17 and thereby induce at points P, Q, a voltage which is a linear combination of the arbitrary voltage of dynamo 2 and the voltage proportional to the current induced by the dynamo 17. In this case, the voltage of the alternator 11 will be controlled so as to be equal to a desired linear combination of an arbitrary voltage and of the current supplied by the alternator 11.

The operation of the system shown in Fig. 4 is shown in the vector diagram of Fig. 5. Here oa represents the voltage at the end of a transmission line with ab representing the voltage drop due to the impedance of the line itself. Assuming that it is desired to have the voltage oa constant, then the alternator 11 must induce a voltage indicated by the vector ob which is variable with the load and precisely varying with the intensity of the current represented by the vector od. The lag is indicated by the angle B. The system of Fig. 4 may be used for controlling the voltage of the alternator 11. In this case, a segment oh of the voltage ob equals the voltage $oa$, then the voltage $ob$ to be induced by the alternator 11 may be considered, substantially as the sum of the constant voltage $oh$ and the voltage $hb$ proportional to the voltage drop $ab$ along the transmission line, providing the angular lag B remains practically constant.

The diagram of Fig. 5 indicates that in the system shown in Fig. 4, the transformer 27 may be utilized to readily take into account the angular lag B of the current with respect to, the voltage, by manipulation of the angularly displaceable member 29 of the transformer.

A number of dynamo electric machines of the metadyne type having special characteristics making them suitable for use in the systems of the instant invention, are disclosed in the prior art. The machine 20, as shown in Fig. 4 is provided with a stator winding 31 which is adapted to compensate the secondary armature reaction. Another stator winding 32 associated with machine 20, is energized by the secondary winding of a transformer 33. The primary winding of transformer 33 is inserted in the secondary brush circuit of the machine 20 and the field winding of the alternator 11. The winding 32 has an anti-hunting action which is more fully described in Patent 2,203,544. The action of the compensating winding 31 is more fully described in the British Patent 420,167.

Fig. 6 shows a system embodying the invention and illustrates a modification thereof. Here, the voltage and current of a generator 61 of the metadyne type, is regulated. The generator includes an armature provided with a pair of short circuited primary brushes $a$, $c$ and a pair of secondary brushes $b$, $d$. The brushes $b$, $d$ are connected to output terminals T, T'. The machine 61 further includes a stator or excitation winding 65 which is energized by a dynamo electric machine 10 of the amplifier metadyne type. The machine 10 is provided with an armature having a pair of short circuited primary brushes $a$, $c$, associated therewith and a pair of secondary brushes $b$, $d$ connected to stator winding 65. The machine 10 is further provided with a control stator winding 38 which is energized through a battery 40 and controlled by a rheostat 39, and a second stator winding 12, for the purpose hereinafter appearing.

The machine 10 is driven by a synchronous motor 22 which also drives a dynamo 2 having a field winding 8, a dynamo 17 having a field winding 15 connected between terminal T' and brush $b$ of generator 61, and a dynamo 50 having a field exciting winding 51 connected across the brushes $b$, $d$ of generator 61.

The dynamo 2 is adapted to produce an arbitrary reference voltage, as previously described. The dynamo 17 is adapted to produce a voltage proportional to the current of generator 61, since the field winding 15 is connected to the secondary brushes of the generator.

A switch 52 is provided for short circuiting the field winding 15. A switch 53 is connected across the terminals of dynamo 17. A switch 54 is connected on one side of the armature of dynamo 50 while another switch 55 is connected on the other side of the dynamo armature. A switch 56 is connected between brush $b$ of generator 61 and field winding 51.

Assuming that switches 52, 53, 54, and 56 are open while switch 55 is closed, then the dynamo 2 is connected in opposed relation to dynamo 17 and the system controls the current of the generator 61 and causes the same to be proportional to the reference voltage of dynamo 2.

Assuming that the switch 55 is opened and switches 52, 53, 54 and 56 are closed, then the dynamo 2 is connected in opposed relation to dynamo 50 and induces a voltage proportional to the voltage supplied by secondary brushes of the generator. Accordingly, the system will control the current of the generator in a manner as to cause the voltage supplied by the generator to be proportional to the reference voltage of the dynamo 2.

Assuming further, that the switches 52, 53 and 55 are open while the switches 54, 56 are closed, then the dynamo 17 is connected in opposed relation to a system comprising the series connected dynamos 2, 50. In this case, the system will control the current of the generator 61 and will cause the same to be equal to a linear combination of an arbitrary voltage and the voltage induced by the generator between its secondary brushes.

In order to further reduce the small variation of the current or the voltage supplied by the generator from the desired value, the ampere turns of the stator winding 38 is preferably set at a value equal to the average value of the ampere turns that would have been created by the regulating current traversing the stator winding 12 of the machine 10, if the winding 38 had been omitted. The setting of winding 38 is accomplished by means of rheostat 39.

The voltage produced by dynamo 2 may be a constant voltage or a voltage following any other arbitrarily defined law appropriate to any special application under consideration.

It is understood that all matter herein set forth or shown in the accompanying drawings, is to be interpreted as illustrative and not in a limiting sense.

I claim:

1. A power system comprising a generator having an excitation circuit, means for controlling the output of said generator comprising dynamo means for producing a voltage proportional to the output voltage of said generator, a dynamo having an excitation winding in circuit with the generator output for inducing a voltage proportional to the output current of said generator, a second dynamo for producing an arbitrary voltage, said dynamo means and said first mentioned dynamo being connected in series with each other, said second mentioned dynamo being connected in opposition to said interconnected dynamo means and said first mentioned dynamo to provide a control current, means for amplifying said control current and supplying said amplified control current to said excitation circuit.

2. A power system comprising a generator having an excitation circuit, means for controlling the output of said generator comprising a dynamo for producing an arbitrary voltage, a second dynamo having an excitation winding in circuit with the generator output for producing a voltage proportional to the output voltage of said generator, and a third dynamo having an excitation winding in circuit with the generator output for producing a voltage proportional to the output current of said generator, said second and third mentioned dynamos being connected in series with each other and said first mentioned dynamo being connected in opposition to said series connected dynamos to provide a control current, means for amplifying the control current and supplying said amplified current to said excitation circuit.

3. A power system as in claim 2 and further including means for regulating the current supplied to said last mentioned excitation winding.

4. A power system comprising a generator including an armature provided with a pair of brushes providing an output circuit and a stator winding, means for controlling the output circuit of said generator comprising a dynamo having an excitation winding connected across said pair of brushes, a second dynamo having an excitation winding connected in series with said pair of brushes, and adapted to produce a voltage proportional to the current of said output circuit, a third dynamo connected in circuit with said first and second mentioned dynamos and adapted to induce an arbitrary voltage, means for selectively providing said stator winding with a control current including switch means for connecting said third and second mentioned dynamos in opposition to each other whereby to produce a control current, means for amplifying said control current and supplying said control current to said stator winding whereby the current of said output circuit will be proportional to said arbitrary voltage, switch means for connecting said first and third mentioned dynamos in opposition to each other whereby to produce a control current, said control current being adapted to be amplified by said amplifying means and supplied to said stator winding whereby the voltage of said output circuit will be proportional to said arbitrary voltage and switch means for connecting said first and third mentioned dynamos in series with each other and connecting said second mentioned dynamo in opposition to said series connected dynamos whereby to induce a control current adapted to be amplified by said amplifying means and supplied to said stator winding whereby the current of said output circuit will be equal to a linear combination of said arbitrary voltage and the voltage induced between said pair of brushes.

5. A power system as set forth in claim 1, wherein said amplifying means comprises a dynamo electric machine having an armature provided with a pair of brushes, and a pair of stator windings, said brushes being connected in said excitation circuit, one of said stator windings being adapted to be supplied with said control current, means for energizing the other of said stator windings to provide ampere turns equal substantially to the average value of the ampere turns provided by the first mentioned stator winding in the absence of said second mentioned stator winding.

6. A power system comprising an alternator, said alternator having a field winding, means for controlling the output of said alternator comprising a dynamo including an excitation winding and adapted to produce a voltage proportional to the current of the output of said alternator, a second dynamo including an excitation winding and adapted to produce a voltage proportional to the voltage of the output of said alternator and a third dynamo adapted to produce an arbitrary voltage, said dynamos being in circuit with each other, a transformer having a primary winding in circuit with the output of said alternator and an angularly displaceable secondary winding, rectifier means in circuit with said transformer secondary winding and the excitation winding of said first mentioned dynamo, rectifier means in circuit with the output of said alternator and the excitation winding of said second mentioned dynamo, switch means for selectively interconnecting said dynamos in selected opposed relationships thereof whereby to produce control currents, and means for amplifying said control currents and supplying said amplified currents to the field winding of said alternator.

7. A power system comprising a generator having an excitation circuit, means for controlling the generator output comprising a dynamo having an excitation winding in circuit with the generator output and responsive to an electrical characteristic of said output, to provide a voltage proportional to said electrical characteristic, a second dynamo for producing an arbitrary voltage connected in opposition to said first dynamo, circuit means connecting said dynamos to provide a resultant control current and means for amplifying said control current and supplying said amplified control current to said generator excitation circuit.

References Cited in the file of this patent

UNITED STATES PATENTS

| Number | Name | Date |
|---|---|---|
| 746,697 | Hallberg | Dec. 15, 1903 |
| 1,352,839 | Schon | Sept. 14, 1920 |
| 2,407,476 | Crever | Sept. 10, 1946 |